S. W. SPARKS.
LATHE MECHANISM.
APPLICATION FILED DEC. 6, 1915.

1,179,362.

Patented Apr. 11, 1916.
3 SHEETS—SHEET 1.

INVENTOR
S. W. Sparks
BY Karl Fruning
his ATTORNEY

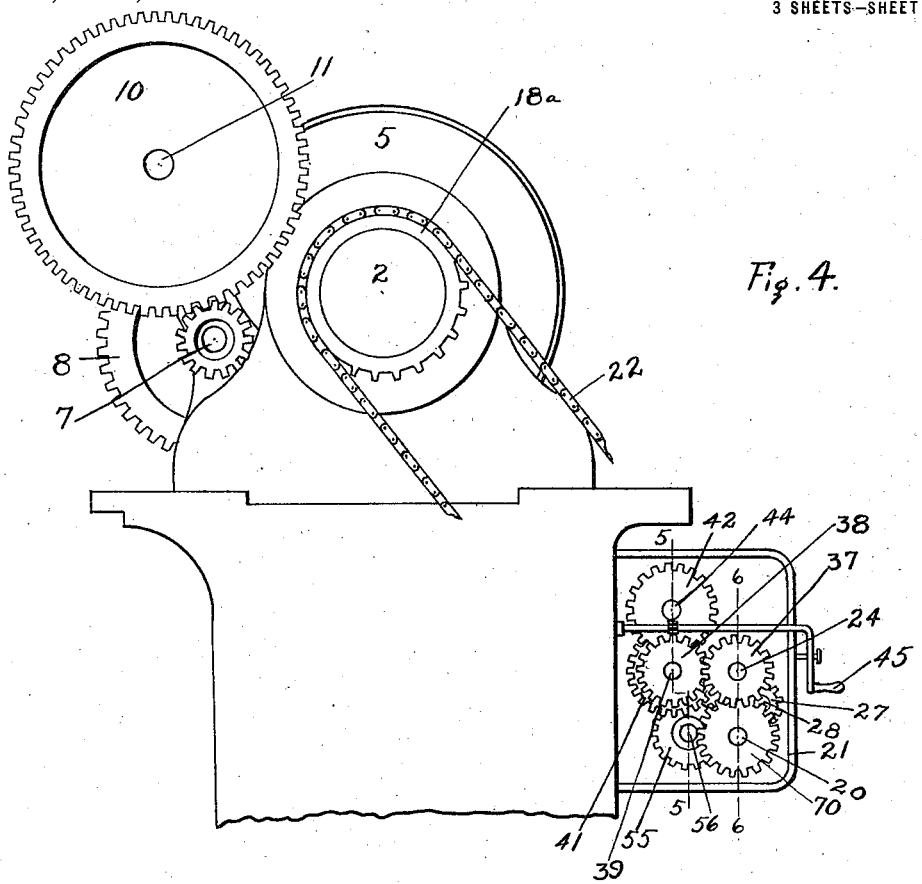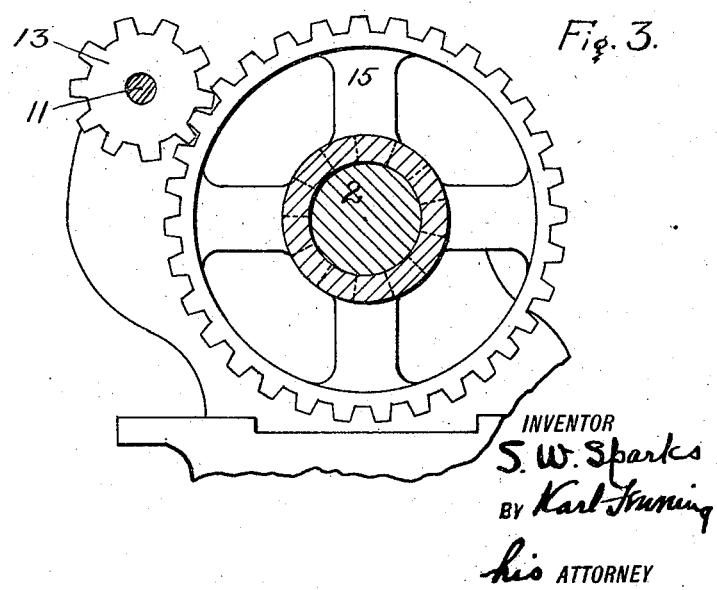

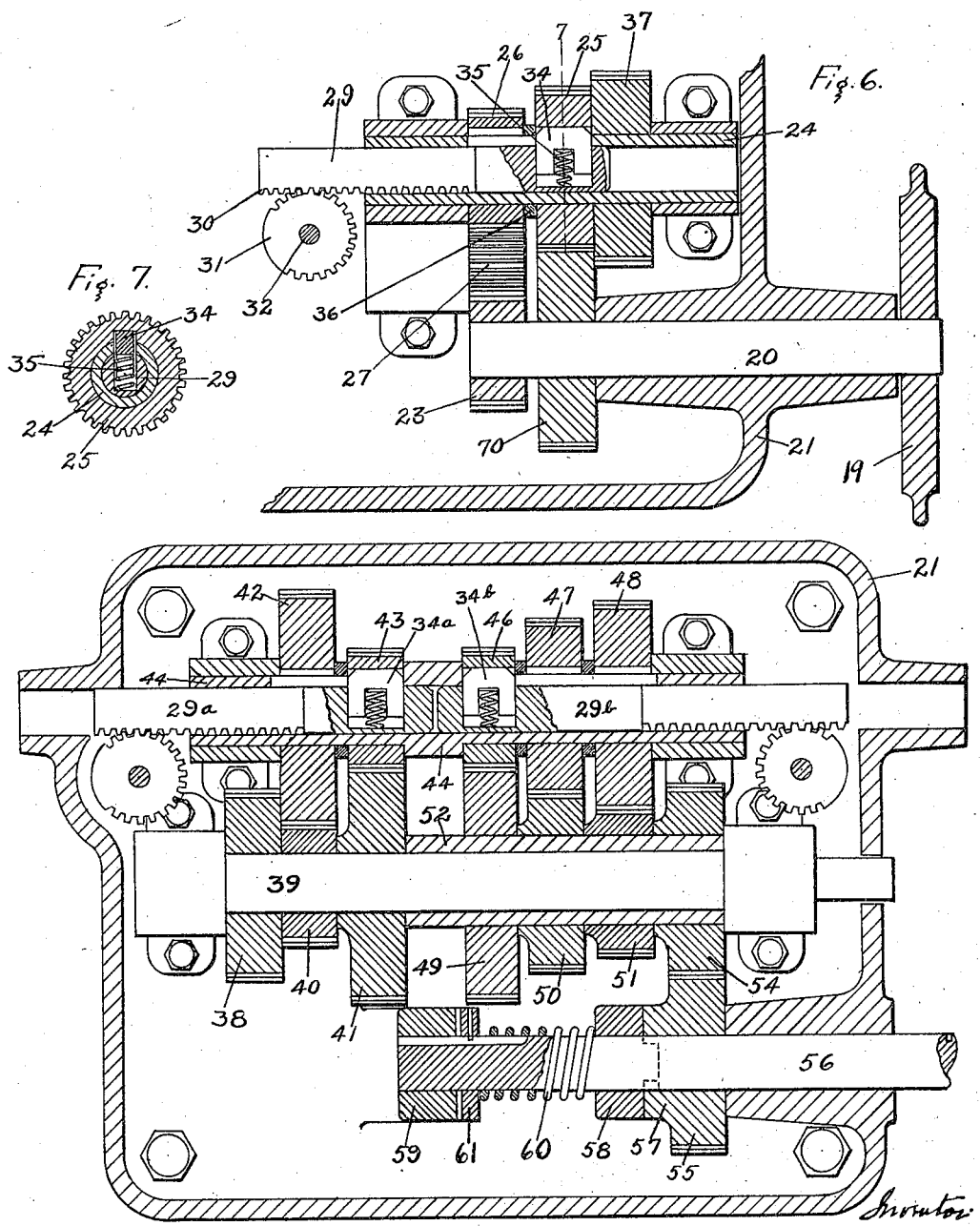

UNITED STATES PATENT OFFICE.

STANLEY W. SPARKS, OF CLEVELAND, OHIO, ASSIGNOR TO THE CLEVELAND MACHINERY & SUPPLY COMPANY, A CORPORATION OF OHIO.

LATHE MECHANISM.

1,179,362.  Specification of Letters Patent.  Patented Apr. 11, 1916.

Application filed December 6, 1915.  Serial No. 65,298.

*To all whom it may concern:*

Be it known that I, STANLEY W. SPARKS, a citizen of the United States, residing at Cleveland, State of Ohio, have invented certain new and useful Improvements in Lathe Mechanism, of which the following is a specification.

My invention relates particularly to the head stock of a lathe and the means for driving the spindle therein and to the means for operating the lead shaft which moves the tool carriage across the lathe bed. In the present invention the spindle is indirectly driven by external driving means. The usual pulley is employed and it drives the spindle through a chain of gears.

The means for operating the lead shaft comprises a set of gears in a gear box, the gears themselves being driven from the spindle preferably through a chain and sprockets.

Figure 2:
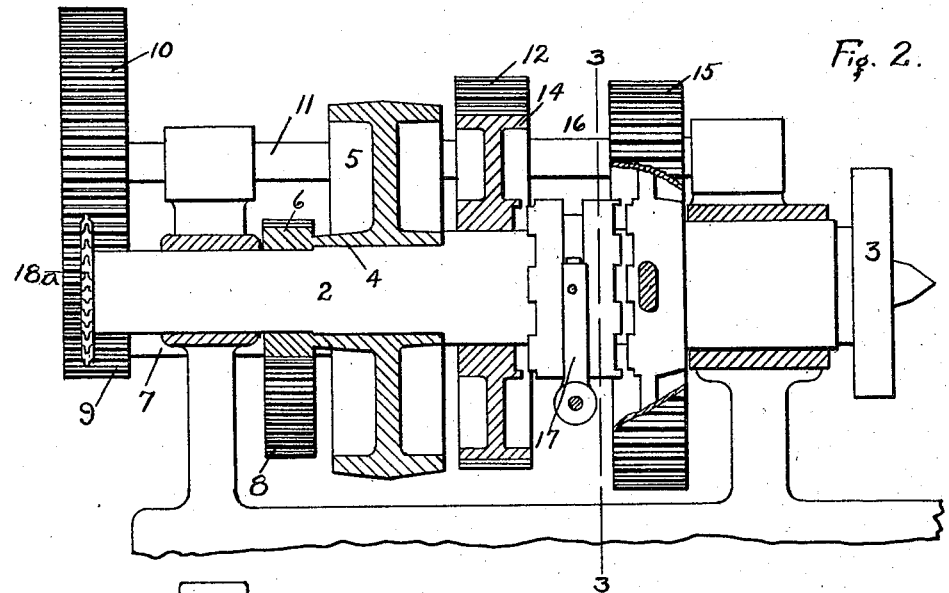
Figure 1:
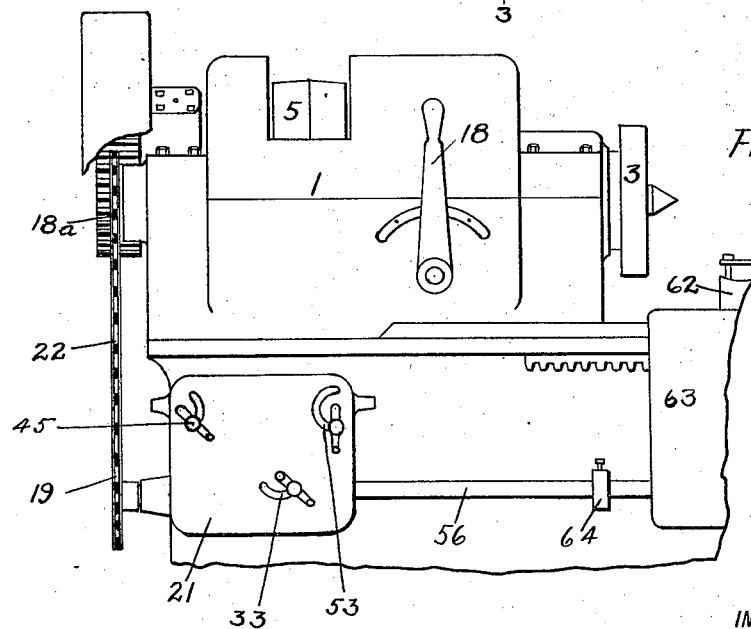

In the accompanying drawings Figure 1 shows a side elevation of the end of a lathe fitted with my improvements. Fig. 2 is a vertical longitudinal section through the center of the spindle, parts being shown in full and parts broken away so as to more clearly illustrate the construction. Fig. 3 is a section on the line 3—3 of Fig. 2 looking toward the right. Fig. 4 is an end view of the lathe, the sprocket and end plate of the gear box associated with the lead shaft being removed to display the gears. Fig. 5 is a section on the line 5—5 of Fig. 4 looking toward the left and Fig. 6 is a section on the line 6—6 looking toward the right. Fig. 7 is a section on line 7 of Fig. 6.

The head stock 1 of the lathe is provided with a spindle 2 carrying the usual face plate 3 to which the material to be worked upon may be fastened.

Revolubly mounted on the spindle 2 is a sleeve 4 which carries a pulley 5 and a gear 6. The pulley 5 may be driven by a belt in any suitable way. Back of the spindle a shaft 7 is carried by the head stock on which are mounted two gears 8 and 9. The gear 8 is arranged to be permanently in engagement with the gear 6 and the gear 9 likewise is permanently in engagement with a gear 10 carried on a back shaft 11, likewise mounted in the head stock. The shaft 11 carries gears 12 (shown in Fig. 2) and 13 (shown in Fig. 3). Mounted loosely on the spindle 2 are two gears one 14 engaging the gear 12, the other 15 engaging the gear 13. Integral with the hubs of the gears 14 and 15 are clutch members and mounted to rotate with the spindle 2 is a clutch member 16 which through the yoke 17 operated by the handle 18 may be caused to engage either the gear 14 or the gear 15 so as to cause the spindle to rotate with one or the other of the gears 14 or 15 or to stand idle when the clutch member 16 is not in engagement with either gear. It will thus be seen that when the pulley 5 is caused to rotate motion will be transmitted from it through the gear 6 to the gear 8 on the shaft 7 and through the gear 9 and the gear 10 to the shaft 11 which carries the gears 12 and 13 which are in engagement with the gears 14 and 15, either of which may be clutched to rotate the spindle. The ratio of the gear 12 to the gear 14 is different from the ratio of the gear 13 to the gear 15 so that the spindle will rotate at one speed or another as the gear 14 or 15 is in engagement with the clutch.

The spindle carries a sprocket 18$^a$ on its end and in alinement with the sprocket 18$^a$ is a sprocket 19 on a shaft 20 projecting from a gear box 21 on the lathe frame. Over the two sprockets 18$^a$ and 19 travels a chain 22, so that when the spindle 2 is rotated motion is transmitted from it through the sprockets and chain to the shaft 20. Within the gear box the shaft 20 carries two gears 70 and 23. Above the shaft 20 is a hollow shaft 24 on which are mounted loosely two gears 25 and 26. Gear 25 is in permanent engagement with the gear 70 on the shaft 20. An intermediate gear 27 mounted on a jack shaft 28 within the gear box is in permanent engagement with the gears 26 and 23. It will be seen thus that when the shaft 20 rotates the gear 25 will be caused to rotate in one direction while the gear 26 will be caused to rotate in the opposite direction and in the specific instance shown, because of the relative sizes of the various gears, the speed in one direction will differ from the speed in the other direction. Within the hollow shaft 24 is a rod 29 which is provided with a rack 30 engaging a pinion 31 on a shaft 32 which may be given a partial turn by the handle 33. When the handle 33 is manipulated the rod is reciprocated within the hollow shaft 24. In a cavity near the inner end of the rod 29 is a key 34 which passes through a slot in the hollow shaft 24 and engages a keyway in the gear 25 or 26 depending upon the position of the rod 29 in the hollow shaft 24. Between the key 34 and the base of the cavity in the rod 29 is a spring 35 tending to keep the key 34 projecting into the keyway in one of the gears. The outer edge of the key 34 is beveled at its ends and between the gears 25 and 26 is a washer 36 which is beveled at its inner edge so that as the rod 29 is reciprocated the beveled edge of the key 34 meets the beveled edge of the washer 36 and the key is depressed against the spring 35 so that it may pass from the gear 25 to the gear 26 in which it will be properly centered by the beveled edges. It will be seen thus that by properly manipulating the handle 33 the hollow shaft 24 may be caused to rotate in one direction by engagement with the gear 25 or in the opposite direction by the gear 26. Mounted to rotate with the hollow shaft 24 is a third gear 37 which is in permanent engagement with a gear 38 mounted to rotate with a shaft 39. Also carried by the shaft 39 are a gear 40 and a gear 41 which in turn are permanently in engagement with gears 42 and 43 respectively. The gears 42 and 43 are loosely mounted on a hollow shaft 44 and they may be selectively caused to engage and rotate the shaft 44 by means of a rod 29$^a$ carrying a key 34$^a$ and operated through a handle 45 as is the rod 29 in the hollow shaft 24. Also loosely mounted on the hollow shaft 44 are three gears 46, 47, and 48 which are in permanent engagement respectively with three gears 49, 50 and 51 mounted to rotate with a sleeve shaft 52 which surrounds and rotates upon the shaft 39. The gears 46, 47, and 48 may be selectively caused to engage and rotate with the hollow shaft 44 through a key 34$^b$ mounted on a rod 29$^b$ operated by a handle 53 in a manner similar to the rod 29 and the key 34 in the hollow shaft 24. In the device illustrated the ratio between the gear 40 and the gear 42 differs from the ratio between the gear 41 and the gear 43 and likewise the ratio between the gear 46 and 49 differs from the ratio between the gear 47 and the gear 50 and that between the gear 48 and the gear 51 so that by properly selecting the positions of the key 34$^a$ and the key 34$^b$ a wide variety of speeds may be given to the sleeve shaft 52. A fourth gear 54 is mounted to rotate with the sleeve shaft 52 and it is permanently in engagement with a gear 55 which is loosely mounted on a lead shaft 56. One side of the loose gear 55 is formed as a clutch member 57 which is normally held in engagement with a clutch member 58 mounted to rotate with the lead shaft 56. The lead shaft 56 is provided with a bearing 59 and between the bearing 59 and the clutch member 58 is a spring 60 tending to push the lead shaft toward the right (see Fig. 5) and so hold the clutch member 58 in engagement with the clutch 57. A washer 61 is inserted between the bearing 59 and the spring 60 to take up wear. It will be seen thus that as the sleeve shaft 52 rotates it drives the lead shaft 46 through the gears 54 and 55 at a speed depending upon the positions of the key 34$^a$ and the key 34$^b$ and in a direction depending upon the position of the key 34.

The lead shaft 56 engages and moves a tool carriage shown diagrammatically at 62 in Fig. 1. Depending from the tool carriage 62 is the usual apron 63. On the lead shaft 56 is an adjustable stop 64 which may be adjusted so as to be placed along the lead shaft so as to be engaged by the apron 63 at the end of the desired travel of the tool carriage. When the apron 63 engages the stop 64 it moves the lead shaft 56 to the left (see Fig. 5) and so disengages the clutch members 57 and 58 and allows the gear 55 to rotate loosely without turning the lead shaft and thus avoid troubles incident to over-travel of the tool carriage. I have shown a lead shaft which is provided with a keyway and not with the customary worm. The lead shaft as shown may be used, and I prefer to so use it, to drive the tool carriage through mechanism such as is shown in my co-pending application, Serial Number 62,778 but my invention is not confined to use with such mechanism.

I claim as my invention:

1. In a lathe, a gear box on the lathe support, a shaft projecting therefrom, means for rotating the shaft, within the gear box two gears on the shaft, two gears engaging the said two gears, a hollow shaft on which the two engaging gears are loosely mounted, means for selectively causing the gears to rotate with the hollow shaft, a gear rigid on the hollow shaft, a jack shaft, three gears rigid thereon one of which engages the gear rigid on the hollow shaft, a second hollow shaft, two gears loose thereon engaging the two other gears rigid on the jack shaft, means for selectively causing the loose gears to rotate the hollow shaft, three other gears loose on the hollow shaft, means for selectively causing the loose gears to rotate with the hollow shaft, a lead shaft projecting from the gear box to operate the lathe carriage, a gear on the lead shaft, and four gears rigid on a hollow shaft surrounding the jack shaft three of which engage the last mentioned three loose gears on the hollow shaft and the fourth of which engages the gear on the lead shaft.

2. In a lathe, a gear box on the lathe support, a shaft projecting therefrom, means for rotating the shaft, within the gear box two gears on the shaft, two gears engaging the said two gears, a hollow shaft on which the two engaging gears are loosely mounted, a rod in the hollow shaft, a rack on the projecting end of the rod, a pinion engaging the rack to reciprocate the rod, a hand lever to operate the pinion, a key beveled at its outer end carried by the rod and sliding in a slot in the hollow shaft, a spring forcing the key radially outward so as to engage one or the other of the loose gears, a beveled washer between the loose gears to aid in retracting and positioning the key, a gear rigid on the hollow shaft, a jack shaft, three gears rigid thereon one of which engages the gear rigid on the hollow shaft, a second hollow shaft, two gears loose thereon engaging the two other gears rigid on the jack shaft, a rod in the hollow shaft, a rack on the projecting end of the rod, a pinion engaging the rack to reciprocate the rod, a hand lever to operate the pinion, a key beveled at its outer end and carried by the rod and sliding in a slot in the hollow shaft, a spring forcing the key radially outward so as to engage one or the other of the loose gears, a beveled washer between the loose gears, to aid in retracting and positioning the key, three other gears loose on the hollow shaft, a second rod in the hollow shaft, a rack on the projecting end of the second rod, a pinion engaging the rack to reciprocate the rod, a hand lever to operate the pinion, a key beveled at its outer end carried by the rod and sliding in a slot in the hollow shaft, a spring forcing the key radially outward so as to engage one or another of the three loose gears, beveled washers between the loose gears to aid in retracting and positioning the key, a lead shaft projecting from the gear box to operate the lathe carriage, a gear loose on the lead shaft, four gears rigid on a hollow shaft surrounding the jack shaft three of which engage the last mentioned three loose gears on the hollow shaft and the fourth of which engages the gear on the lead shaft, a clutch member integral with the gear on the lead shaft, a second clutch member rigid with the lead shaft, a bearing for the lead shaft, through which it may slide, a spring between the bearing and the second clutch member to hold the clutch members in engagement, and an adjustable collar on the lead shaft which when engaged releases the clutch.

3. In a lathe, a gear box on the lathe support, a shaft projecting therefrom, means for rotating the shaft, within the gear box two gears on the shaft, two gears engaging the said two gears, a hollow shaft on which the two engaging gears are loosely mounted, means for selectively causing the gears to rotate with the shaft, a gear rigid on the hollow shaft, a jack shaft, three gears rigid thereon one of which engages the gear rigid on the hollow shaft, a second hollow shaft, two gears loose thereon engaging the two other gears rigid on the jack shaft, means for selectively causing the loose gears to rotate the hollow shaft, three other gears loose on the hollow shaft, means for selectively causing the loose gears to rotate with the hollow shaft, a lead shaft projecting from the gear box to operate the lathe carriage, a gear loose on the lead shaft, a clutch for causing the gear to rotate the lead shaft, and four gears rigid on a hollow shaft surrounding the jack shaft three of which engage the last mentioned three loose gears on the hollow shaft and the fourth of which engages the gear on the lead shaft.

Signed at Cleveland this 29 day of November, 1915.

STANLEY W. SPARKS.

Copies of this patent may be obtained for five cents each, by addressing the "Commissioner of Patents, Washington, D. C."